US012118911B2

(12) United States Patent
Wang

(10) Patent No.: US 12,118,911 B2
(45) Date of Patent: Oct. 15, 2024

(54) DEMULTIPLEXER CIRCUIT, DISPLAY PANEL AND DRIVING METHOD OF DISPLAY PANEL

(71) Applicant: Wuhan China Star Optoelectronics Technology Co., Ltd., Hubei (CN)

(72) Inventor: Lifang Wang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/298,636

(22) PCT Filed: May 10, 2021

(86) PCT No.: PCT/CN2021/092588
§ 371 (c)(1),
(2) Date: Nov. 3, 2022

(87) PCT Pub. No.: WO2022/227111
PCT Pub. Date: Nov. 3, 2022

(65) Prior Publication Data

US 2024/0013694 A1 Jan. 11, 2024

(30) Foreign Application Priority Data

Apr. 26, 2021 (CN) ......................... 202110455847.9

(51) Int. Cl.
*G09G 3/20* (2006.01)

(52) U.S. Cl.
CPC ............. *G09G 3/2003* (2013.01); *G09G 3/20* (2013.01); *G09G 2310/0297* (2013.01); *G09G 2330/021* (2013.01); *G09G 2340/0435* (2013.01)

(58) Field of Classification Search
CPC .......... G09G 3/32; G09G 3/36; G09G 3/2003; G09G 2310/0297; G09G 2330/021
See application file for complete search history.

(56) References Cited

U.S. PATENT DOCUMENTS

| | | | | |
|---|---|---|---|---|
| 2007/0211003 | A1 | 9/2007 | Chen et al. | |
| 2018/0293943 | A1 | 10/2018 | Hong et al. | |
| 2020/0013331 | A1 | 1/2020 | Kobayashi | |
| 2020/0051486 | A1 | 2/2020 | Chang et al. | |
| 2020/0320923 | A1* | 10/2020 | Choi | G09G 3/3275 |

FOREIGN PATENT DOCUMENTS

| | | |
|---|---|---|
| CN | 106531096 | 3/2017 |
| CN | 108648702 | 10/2018 |
| CN | 110335561 | 10/2019 |
| CN | 110928086 | 3/2020 |
| CN | 111653247 | 9/2020 |
| EP | 3544292 | 9/2019 |

* cited by examiner

*Primary Examiner* — Nitin Patel
*Assistant Examiner* — Cory A Almeida

(57) ABSTRACT

Embodiments of the present application provide a demultiplexer circuit, a display panel and a driving method of a display panel. The display panel includes a first operating frequency and a second operating frequency. Responsive to the display panel being at the first operating frequency, the first switch unit is in a switched-on state and the second switch unit is in a switched-off state; responsive to the display panel being at the second operating frequency, both the first switch unit and the second switch unit are in the switched-on state.

17 Claims, 6 Drawing Sheets

DEMULTIPLEXER CIRCUIT, DISPLAY PANEL AND DRIVING METHOD OF DISPLAY PANEL

RELATED APPLICATIONS

This application is a National Phase of PCT Patent Application No. PCT/CN2021/092588 having International filing date of May 10, 2021, which claims the benefit of priority of Chinese Patent Application No. 202110455847.9 filed on Apr. 26, 2021. The contents of the above applications are all incorporated by reference as if fully set forth herein in their entirety.

FIELD AND BACKGROUND OF THE INVENTION

The present application relates to display technologies, and more particularly, to a demultiplexer circuit, a display panel and a driving method of a display panel.

Currently, display technologies are widely applied in televisions, mobile phones, and for presentation of public information. Flat displays for displaying images are vigorously promoted due to its advantages of ultra-thin and energy saving properties. With continuous development of telecommunication industries, the function of display products becomes more and more powerful. It has been evolved from an original, single display function to integrated functions of voice, data, image, music and multimedia. As the function of display products becomes more and more powerful, their power loss is getting aggressive. As such, reducing power consumption of the display products so as to enhance market competitiveness of the display products has become a trend of development of the display products.

For an existing display panel driven by demultiplexing (Demux) technologies, it needs to be designed to increase charging rate for pixels in order to realize a display panel capable of being driving by a high frequency. Currently, increasing the width W of a pixel device and the channel width W of Demux device is primarily employed to increase channel current of the device so as to increase the charging rate for the pixels. However, it can be seen from a power consumption formula P=(1/2)*c*f*V2 that the power consumption of the display panel is proportional to the frequency f used to drive the panel and coupling capacitance C. As a result, when the display panel operates at a high frequency, it is inevitable for the display panel to increase the power consumption dramatically. When the display panel operates at a low frequency, the power consumption of the display panel will also doubly increase because of an increase of the device channel width W due to a need of compatibility with the high-frequency driving. Therefore, how to reduce power consumption of the display panel in dynamical displaying so as to effectively reduce power consumption of display products is a technical problem needed to be solved by a person of ordinary skill in the art.

SUMMARY OF THE INVENTION

Embodiments of the present application provide a demultiplexer circuit, a display panel and a driving method of a display panel, which can effectively reduce power consumption of the display panel.

To realize above functions, the technical solutions provided in the present application are described below.

A demultiplexer circuit, wherein the demultiplexer circuit includes at least one demultiplexing module, and the demultiplexing module at least includes a first switch unit and a second switch unit;

a signal input end of the first switch unit and a signal input end of the second switch unit are connected to each other to form a data signal input end of the demultiplexing module, and a signal output end of the first switch unit and a signal output end of the second switch unit are connected to each other to form a data signal output end of the demultiplexing module;

wherein the demultiplexing module further includes a plurality of control signal lines, the control signal lines at least include a first control signal line and a second control signal line, a control end of the first switch unit is connected to the first control signal line, and a control end of the second switch unit is connected to the second control signal line.

Optionally, in some embodiments of the present application, the first control signal line outputs a first switch control signal to the first switch unit, and the second control signal line outputs a second switch control signal to the second switch unit.

Optionally, in some embodiments of the present application, the first control signal line and the second control signal line are electrically connected to an integrated circuit.

Optionally, in some embodiments of the present application, the first control signal line outputs a second switch control signal to the first switch unit, and the second control signal line outputs the second switch control signal to the second switch unit.

Optionally, in some embodiments of the present application, the first control signal line is electrically connected to an integrated circuit, the second control signal line is electrically connected to the first control signal line via a frequency-based switch, and a control end of the frequency-based switch is electrically connected to the integrated circuit.

Optionally, in some embodiments of the present application, the first switch unit at least includes a first switching transistor, and the second switch unit at least includes a second switching transistor;

wherein in the demultiplexing module, the first control signal line is electrically connected to a gate of the first switching transistor and the second control signal line is electrically connected to a gate of the second switching transistor.

Optionally, in some embodiments of the present application, a source of the first switching transistor and a source of the second switching transistor are connected to each other to form the data signal input end of the demultiplexing module;

a drain of the first switching transistor and a drain of the second switching transistor are connected to each other to form the data signal output end of the demultiplexing module.

Optionally, in some embodiments of the present application, at least one of the first switch unit and the second switch unit includes N switching transistors, where N is a positive integer greater than or equal to 2.

Optionally, in some embodiments of the present application, the first switch unit at least includes a first switching transistor, and the second switch unit includes a second switching transistor and a third switching transistor;

wherein in the demultiplexing module, a gate of the first switch transistor is electrically connected to the first control signal line and a gate of the second switching transistor and a gate of the third switching transistor are electrically connected to the second control signal line.

Optionally, in some embodiments of the present application, a source of the first switching transistor, a source of the second switching transistor and a source of the third switching transistor are connected together to form the data signal input end of the demultiplexing module;

a drain of the first switching transistor, a drain of the second switching transistor and a drain of the third switching transistor are connected together to form the data signal output end of the demultiplexing module.

Correspondingly, embodiments of the present application further provide a display panel, including:

a plurality of pixel units, any of the pixel units including a plurality of subpixels;

a plurality of fanout lines, providing data signals for the pixel units;

a demultiplexer circuit, including at least one demultiplexing module, the demultiplexing module at least including a first switch unit and a second switch unit;

an integrated circuit, electrically connected to the demultiplexer circuit and providing control signals for the first switch unit and the second switch unit of the demultiplexer circuit;

wherein any of the pixel units corresponds to a plurality of said demultiplexing modules; in the demultiplexing module, a signal input end of the first switch unit and a signal input end of the second switch unit are connected to each other to form a data signal input end of the demultiplexing module, and a signal output end of the first switch unit and a signal output end of the second switch unit are connected to each other to form a data signal output end of the demultiplexing module.

Optionally, in some embodiments of the present application, the data signal input ends of the demultiplexing modules of the demultiplexer circuit corresponding to a same pixel unit are fed with a same data signal by a same fanout line, and the data signal output end of any of the demultiplexing modules of the demultiplexer circuit is electrically connected to the subpixel.

Optionally, in some embodiments of the present application, the demultiplexing module further includes a plurality of control signal lines, the control signal lines at least include a first control signal line and a second control signal line, a control end of the first switch unit is connected to the first control signal line, and a control end of the second switch unit is connected to the second control signal line.

Optionally, in some embodiments of the present application, the control ends of the first switch units of the demultiplexing modules corresponding to a same row of subpixels with a same color are connected to the same first control signal line, and the control ends of the second switch units of the demultiplexing modules corresponding to a same row of subpixels with a same color are connected to the same second control signal line.

Optionally, in some embodiments of the present application, the first control signal line outputs a first switch control signal to the first switch unit, and the second control signal line outputs a second switch control signal to the second switch unit.

Optionally, in some embodiments of the present application, the first control signal line and the second control signal line are electrically connected to the integrated circuit.

Optionally, in some embodiments of the present application, the first control signal line outputs a second switch control signal to the first switch unit, and the second control signal line outputs the second switch control signal to the second switch unit.

Optionally, in some embodiments of the present application, the first control signal line is electrically connected to the integrated circuit, the second control signal line is electrically connected to the first control signal line via a frequency-based switch, and a control end of the frequency-based switch is electrically connected to the integrated circuit.

Correspondingly, embodiments of the present application further provide a driving method of a display panel, the display panel including:

a plurality of pixel units, any of the pixel units including a plurality of subpixels;

a plurality of fanout lines, providing data signals for the pixel units;

a demultiplexer circuit, including at least one demultiplexing module, the demultiplexing module at least including a first switch unit and a second switch unit;

an integrated circuit, electrically connected to the demultiplexer circuit and providing control signals for the first switch unit and the second switch unit of the demultiplexer circuit;

wherein any of the pixel units corresponds to a plurality of said demultiplexing modules; in the demultiplexing module, a signal input end of the first switch unit and a signal input end of the second switch unit are connected to each other to form a data signal input end of the demultiplexing module, and a signal output end of the first switch unit and a signal output end of the second switch unit are connected to each other to form a data signal output end of the demultiplexing module;

the display panel further including a first operating frequency and a second operating frequency, wherein the first operating frequency is less than the second operating frequency;

responsive to the display panel being at the first operating frequency, the first switch unit is in a switched-on state and the second switch unit is in a switched-off state;

responsive to the display panel being at the second operating frequency, both the first switch unit and the second switch unit are in the switched-on state.

Optionally, in some embodiments of the present application, the first operating frequency is for a low-frequency operating state and the second operating frequency is for a high-frequency operating state.

Beneficial effects of the present application are described below. The present application provides a demultiplexer circuit, a display panel and a driving method of a display panel. The demultiplexer circuit includes at least one demultiplexing module, and the demultiplexing module at least includes a first switch unit and a second switch unit. The display panel includes a first operating frequency and a second operating frequency, wherein the first operating frequency is less than the second operating frequency. When the display panel is at the first operating frequency, the first switch unit is in a switched-on state and the second switch unit is in a switched-off state. When the display panel is at the second operating frequency, both the first switch unit and the second switch unit are in the switched-on state. Compared to the existing display panel capable of switching between high and low operating frequencies, power consumption of the display panel can be effectively reduced when the driving method is applied in driving the display panel.

BRIEF DESCRIPTION OF THE SEVERAL VIEWS OF THE DRAWINGS

The technical solutions and other beneficial effects of the present application will be more apparent with reference to the detailed descriptions of the embodiments of the present application below in accompanying with the drawings.

DESCRIPTION OF SPECIFIC EMBODIMENTS OF THE INVENTION

The present application provides a demultiplexer circuit, a display panel and a driving method of a display panel. To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

Figure 1:
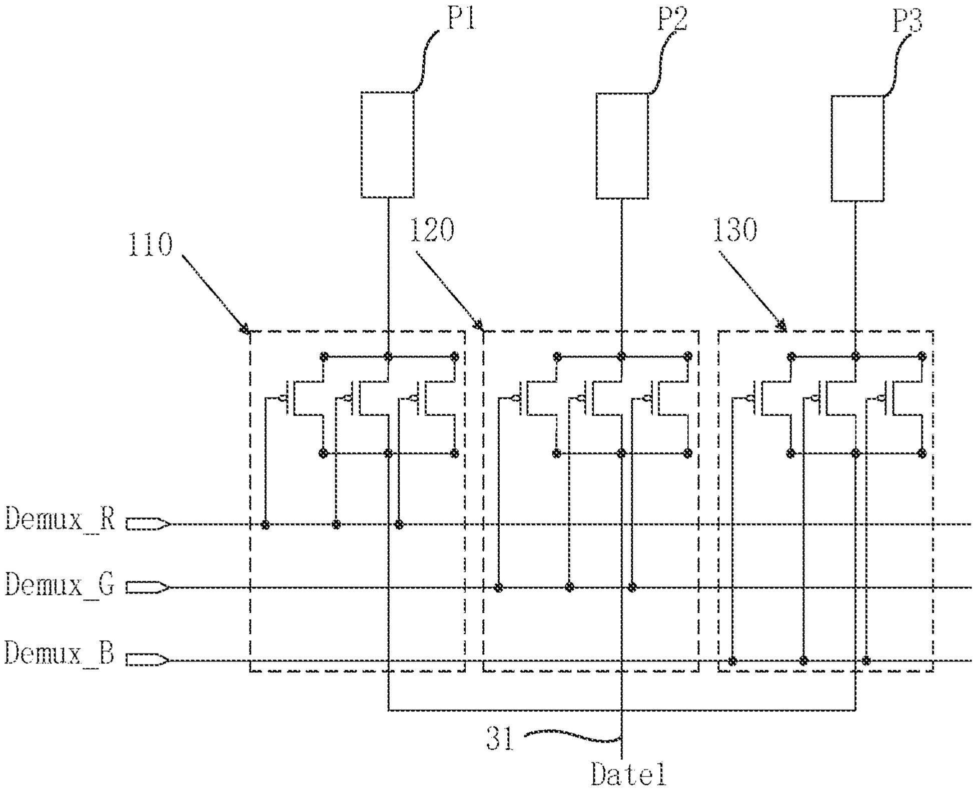
FIG. 1 is a schematic diagram illustrating an equivalent circuit for a demultiplexer circuit of an existing high-frequency display panel.

In the existing arts, in order to realize high-frequency driving of the display panel, it needs to be designed to increase charging rate for pixels. Currently, increasing channel width W of a demultiplexer (Demux) device is usually employed to increase channel current of the device so as to increase the charging rate for the pixels. As shown in FIG. 1, the display panel includes three subpixels P1 to P3; a plurality of auxiliary connecting lines (not labeled in the figure); a fanout line 31, providing a same data signal Date 1 for the subpixels by using the plurality of auxiliary connecting lines; a demultiplexer circuit, including at least three demultiplexing modules including a first demultiplexing module 110, a second demultiplexing module 120 and a third demultiplexing module 130; a plurality of control signal lines, at least including a Demux_R line, a Demux_G line and a Demux_B line; the first demultiplexing module 110 electrically connecting to the Demux_R line, the second demultiplexing module 120 electrically connecting to the Demux_G line, and the third demultiplexing module 130 electrically connecting to the Demux_B line, wherein any of the demultiplexing modules includes three thin-film transistors.

It can be seen from a power consumption formula P=(1/2)*c*f*V2 that the power consumption of the display panel is proportional to the frequency f used to drive the panel and coupling capacitance C. As a result, when the display panel operates at a high frequency, it is inevitable for the display panel to increase the power consumption dramatically. When the display panel operates at a low frequency, the power consumption of the display panel will also doubly increase because of an increase of the device channel width W due to a need of compatibility with the high-frequency driving. Based on this, embodiments of the present application provide a demultiplexer circuit, a display panel and a driving method of a display panel, which can effectively reduce the power consumption of the display panel.

Figure 2:
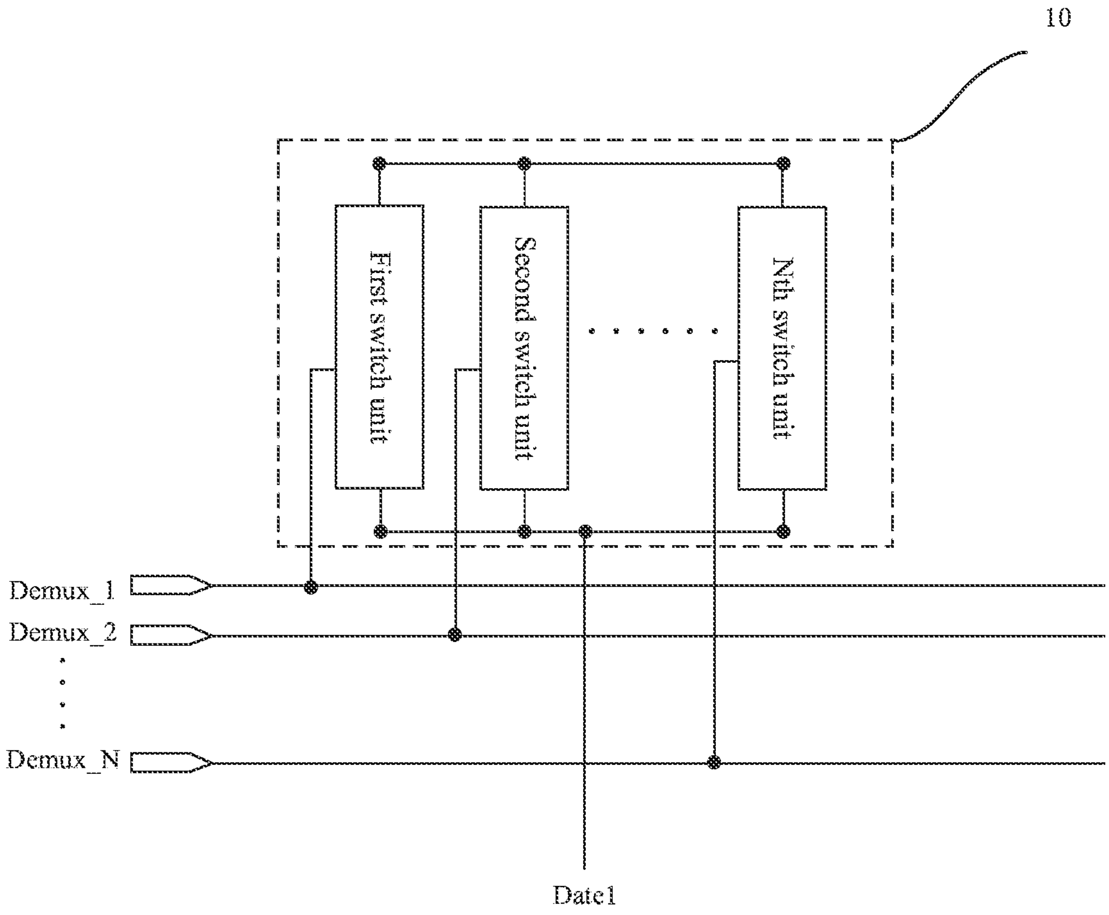
FIG. 2 is a schematic diagram illustrating a first type of equivalent circuit for a demultiplexer circuit provided in the present application.

Referring to FIG. 2, the present application provides a demultiplexer circuit. The demultiplexer circuit includes at least one demultiplexing module 10. The demultiplexing module 10 includes N switch units. Signal input ends of the N switch units are connected together to form a data signal input end of the demultiplexing module 10. Signal output ends of the N switch units are connected together to form a data signal output end of the demultiplexing module 10. A control end of a Nth switch unit is fed with a Nth switch control signal Demux_N, where N is a positive integer greater than or equal to 2.

Figure 3:
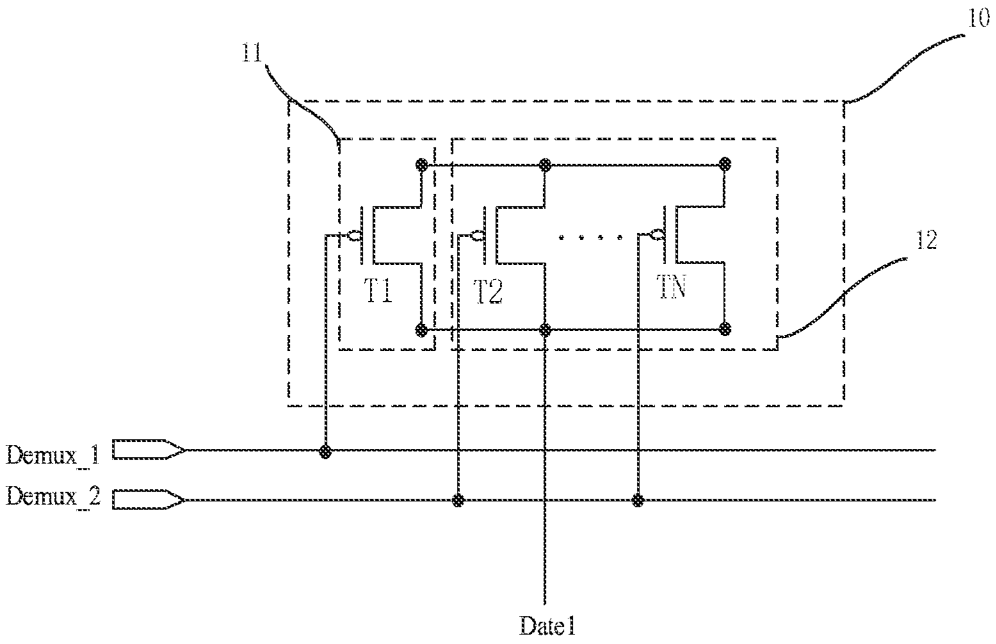
FIG. 3 is a schematic diagram illustrating a second type of equivalent circuit for a demultiplexer circuit provided in the present application.

For more details, in the present application, referring to FIG. 3, the demultiplexing module 10 at least includes a first switch unit 11 and a second switch unit 12. The control end of the first switch unit 11 is connected to a first control signal line Demux_1, and the control end of the second switch unit 12 is connected to a second control signal line Demux_2.

In the present application, the first control signal line Demux_1 outputs a first switch control signal to the first switch unit 11, and the second control signal line Demux_2 outputs a second switch control signal to the second switch unit 12.

Among the first switch unit 11 and the second switch unit 12, at least one of the switching units includes N switching transistors, where N is a positive integer greater than or equal to 2.

Specifically, in a case of N=2, the first switch unit 11 includes one switch transistor and the second switch unit 12 includes two switch transistors.

It can be understood that the number of the switch units and the number of switching transistors of the switch unit are not limited in the present application.

It needs to be noted that the first control signal includes but is not limited to a low level signal and the second control signal includes but is not limited to a high level signal, and using the first control signal line Demux_1 to output the first switch control signal to the first switch unit 11 and using the second control signal line Demux_2 to output the second switch control signal to the second switch unit 12 are both only for illustration and the present application is not limited thereto.

Figure 8:
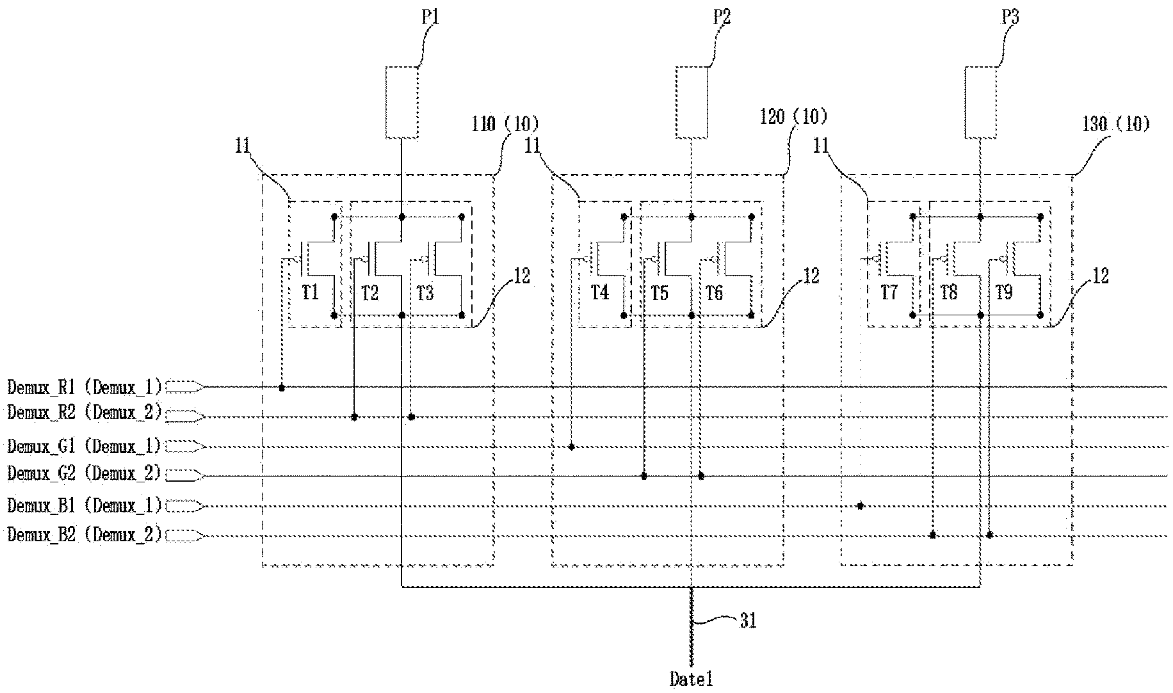
FIG. 8 is a schematic diagram illustrating a first type of equivalent circuit for a demultiplexer circuit of a display panel provided in an embodiment of the present application.
Figure 10:
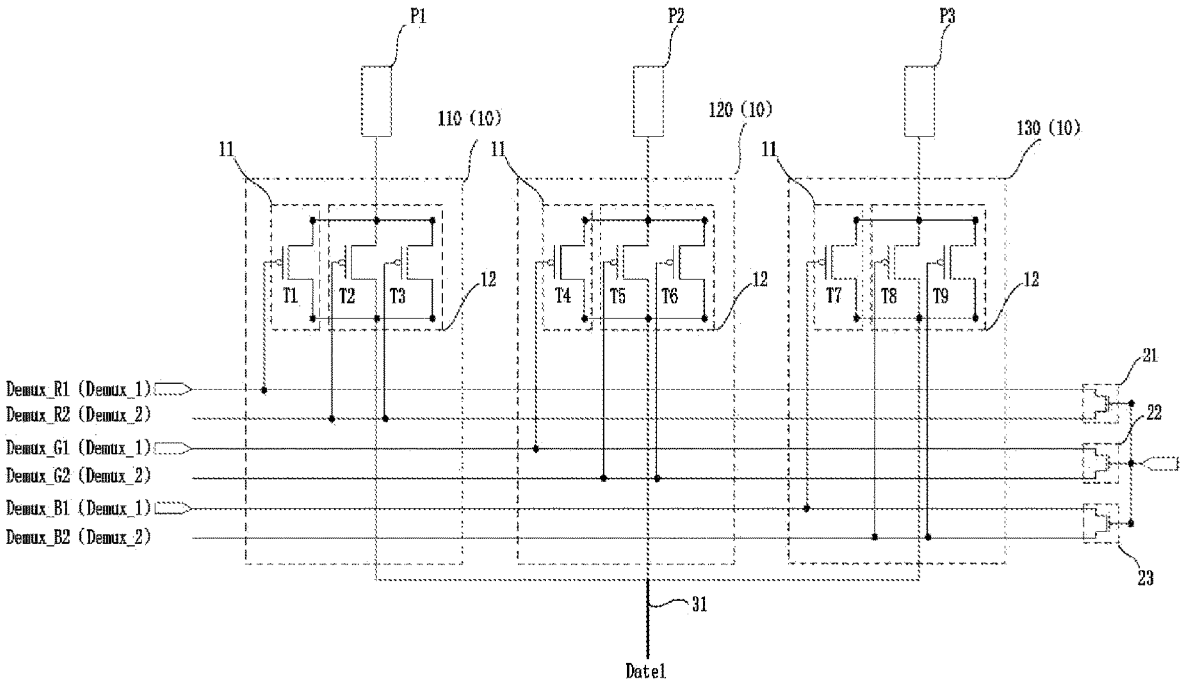
FIG. 10 is a schematic diagram illustrating a second type of equivalent circuit for a demultiplexer circuit of a display panel provided in an embodiment of the present application.

Referring to FIG. 8 and FIG. 10, the present application provides a display panel. The display panel includes a plurality of pixel units (not labeled in the figures), any of the pixel units including a plurality of subpixels P; a plurality of fanout lines, providing data signals for the pixel units; a demultiplexer circuit, including at least one demultiplexing module 10, the demultiplexing module 10 at least including a first switch unit 11 and a second switch unit 12; an integrated circuit (not shown in the figures), electrically connected to the demultiplexer circuit and providing control signals for the first switch unit 11 and the second switch unit 12 of the demultiplexer circuit.

Any of the pixel units corresponds to a plurality of said demultiplexing modules 10. In the demultiplexing module 10, a signal input end of the first switch unit 11 and a signal input end of the second switch unit 12 are connected to each other to form a data signal input end of the demultiplexing module 10, and a signal output end of the first switch unit 11 and a signal output end of the second switch unit 12 are connected to each other to form a data signal output end of the demultiplexing module 10.

In the present application, the data signal input ends of the demultiplexing modules of the demultiplexer circuit corresponding to a same pixel unit are fed with a same data signal by a same fanout line, and the data signal output end of any of the demultiplexing modules 10 of the demultiplexer circuit is electrically connected to the subpixel P.

Specifically, the data signal output end of any of the demultiplexing modules 10 of the demultiplexer circuit is connected to a row of subpixels P via one data line.

In the present application, the demultiplexing module 10 further includes a plurality of control signal lines, the control signal lines at least include a first control signal line Demux_1 and a second control signal line Demux_2, a control end of the first switch unit 11 is connected to the first control signal line Demux_1, and a control end of the second switch unit 12 is connected to the second control signal line Demux_2.

In FIG. 8, the first control signal line Demux_1 outputs a first switch control signal to the first switch unit 11, and the second control signal line Demux_2 outputs a second switch control signal to the second switch unit 12. In FIG. 10, the first control signal line Demux_1 outputs a second switch control signal to the first switch unit 11, and the second control signal line Demux_2 outputs the second switch control signal to the second switch unit 12.

It needs to be noted that the number of the subpixels P is not limited in the present application, only three subpixels P are labeled in FIG. 8 and FIG. 10, and the subpixels P include but are not limited to a red subpixel R, a green subpixel G and a blue subpixel B. 14. The control ends of the first switch units 11 of the demultiplexing modules 10 corresponding to the subpixels with a same color are connected to the same first control signal line Demux_1, and the control ends of the second switch units 12 of the demultiplexing modules corresponding to the subpixels P with a same color are connected to the same second control signal line Demux_2.

It needs to be noted that the first control signal includes but is not limited to a low level signal and the second control signal includes but is not limited to a high level signal, and the present application is not limited to this configuration.

Referring to FIG. 10, the present application provides a driving method of a display panel including the display panel provided in above context. The display panel includes a first operating frequency and a second operating frequency, in which the first operating frequency is less than the second operating frequency.

Responsive to the display panel being at the first operating frequency, the first switch unit 11 is in a switched-on state and the second switch unit is in a switched-off state.

Responsive to the display panel being at the second operating frequency, both the first switch unit and the second switch unit are in the switched-on state.

The technical solutions of the present application will be described with reference to embodiments as follows.

Figure 4:
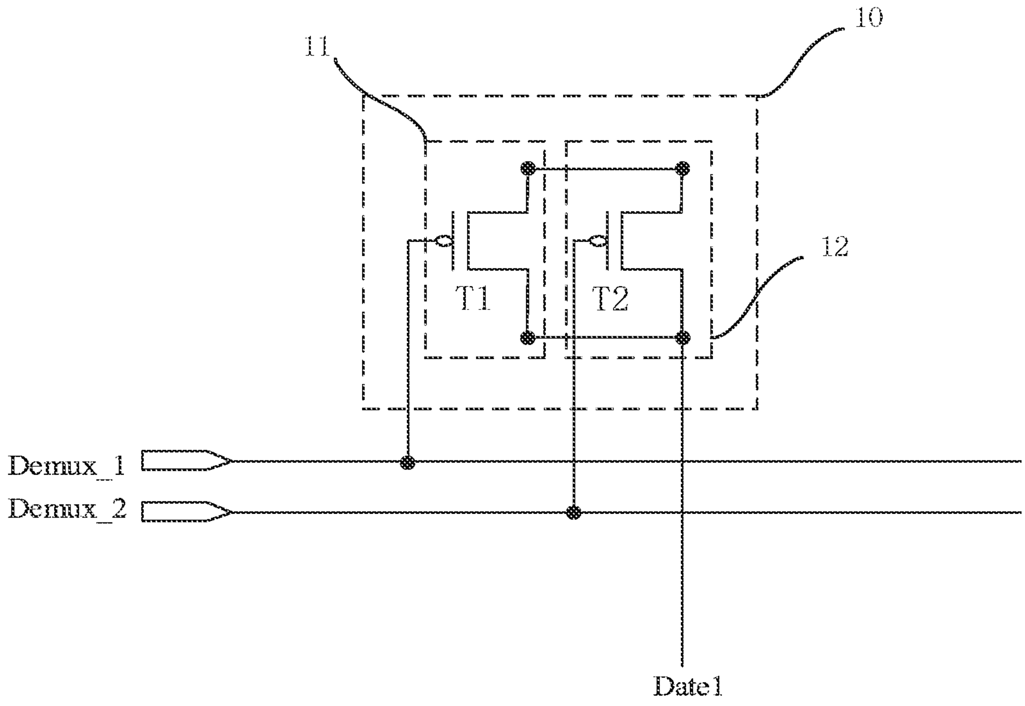
FIG. 4 is a schematic diagram illustrating a first type of equivalent circuit for a demultiplexer circuit provided in an embodiment of the present application.

FIG. 4 is a schematic diagram illustrating a first type of equivalent circuit for a demultiplexer circuit provided in an embodiment of the present application.

The present embodiment provides a demultiplexer circuit. The demultiplexer circuit includes at least one demultiplexing module 10, and the demultiplexing module at least includes a first switch unit 11 and a second switch unit 12.

A signal input end of the first switch unit 11 and a signal input end of the second switch unit 12 are connected to each other to form a data signal input end of the demultiplexing module 10, and a signal output end of the first switch unit 11 and a signal output end of the second switch unit 12 are connected to each other to form a data signal output end of the demultiplexing module 10.

The demultiplexing module 10 further includes a plurality of control signal lines, the control signal lines at least include a first control signal line Demux_1 and a second control signal line Demux_2, a control end of the first switch unit 11 is connected to the first control signal line Demux_1, and a control end of the second switch unit 12 is connected to the second control signal line Demux_2.

In the present embodiment, the first control signal line Demux_1 outputs a first switch control signal to the first switch unit 11, and the second control signal line Demux_2 outputs a second switch control signal to the second switch unit 12.

It needs to be noted that the first control signal includes but is not limited to a low level signal and the second control signal includes but is not limited to a high level signal, and the present application is not limited to this configuration.

Specifically, in the present embodiment, the first control signal line and the second control signal line are electrically connected to an integrated circuit (not show in the figure). It needs to be noted that in the present embodiment, the integrated circuit includes but is not limited to a data driving chip and the integrated circuit is configured to output signals to the plurality of control signal lines and the driving demultiplexing modules.

In the present embodiment, the first switch unit 11 at least includes a first switching transistor T1, and the second switch unit 12 at least includes a second switching transistor T2.

In the demultiplexing module 10, the first control signal line Demux_1 is electrically connected to a gate of the first switching transistor T1 and the second control signal line Demux_2 is electrically connected to a gate of the second switching transistor T2.

A source of the first switching transistor T1 and a source of the second switching transistor T2 are connected to each other to form the data signal input end of the demultiplexing module 10.

A drain of the first switching transistor T1 and a drain of the second switching transistor T2 are connected to each other to form the data signal output end of the demultiplexing module 10.

It can be understood that it is only for illustration for the case that the source of the first switching transistor T1 and the source of the second switching transistor T2 are connected to each other to form the data signal input end of the demultiplexing module 10 and the drain of the first switching transistor T1 and the drain of the second switching transistor T2 are connected to each other to form the data signal output end of the demultiplexing module 10, and the present embodiment is not limited to this configuration.

Figure 5:
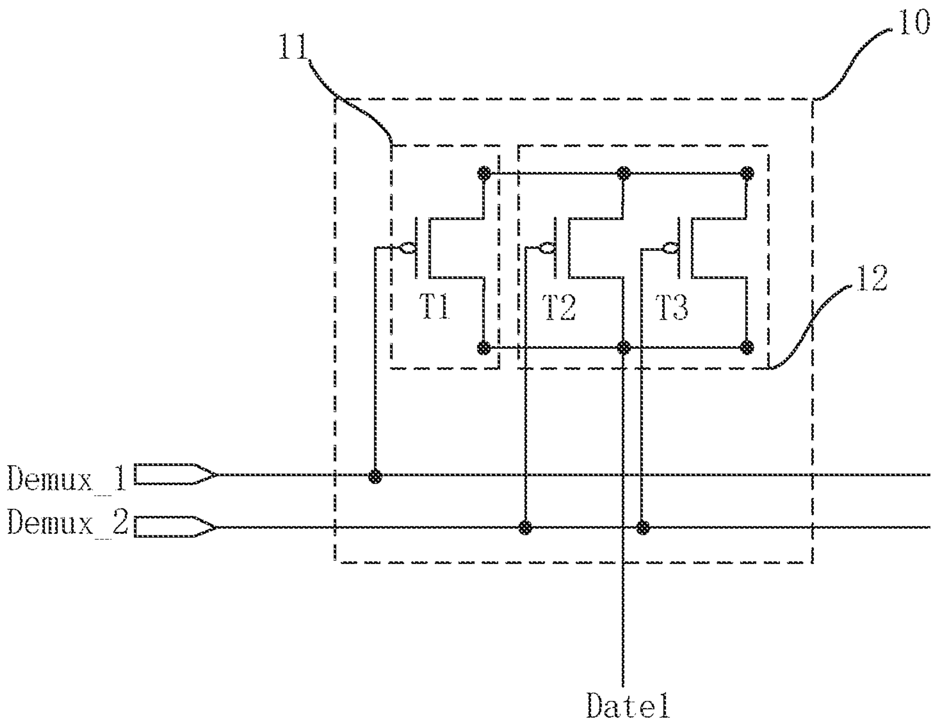
FIG. 5 is a schematic diagram illustrating a second type of equivalent circuit for a demultiplexer circuit provided in an embodiment of the present application.

FIG. 5 is a schematic diagram illustrating a second type of equivalent circuit for a demultiplexer circuit provided in an embodiment of the present application.

The schematic equivalent diagram of the demultiplexer circuit in the present embodiment is similar to or the same as the first type of schematic equivalent diagram of the demultiplexer circuit provided in foregoing embodiment, and is referred to the descriptions on the schematic equivalent diagram of the demultiplexer circuit in foregoing embodiment, and is not repeated herein. The differences between them are described below.

In the present embodiment, the first switch unit 11 includes a first switching transistor T1, and the second switch unit 12 includes a second switching transistor T2 and a third switching transistor T3.

In the demultiplexing module 10, a gate of the first switch transistor T1 is electrically connected to the first control signal line Demux_1 and a gate of the second switching transistor T2 and a gate of the third switching transistor T3 are electrically connected to the second control signal line Demux_2.

A source of the first switching transistor T1, a source of the second switching transistor T2 and a source of the third switching transistor T3 are connected together to form the data signal input end of the demultiplexing module 10.

A drain of the first switching transistor T1, a drain of the second switching transistor T2 and a drain of the third switching transistor T3 are connected together to form the data signal output end of the demultiplexing module 10.

Figure 6:
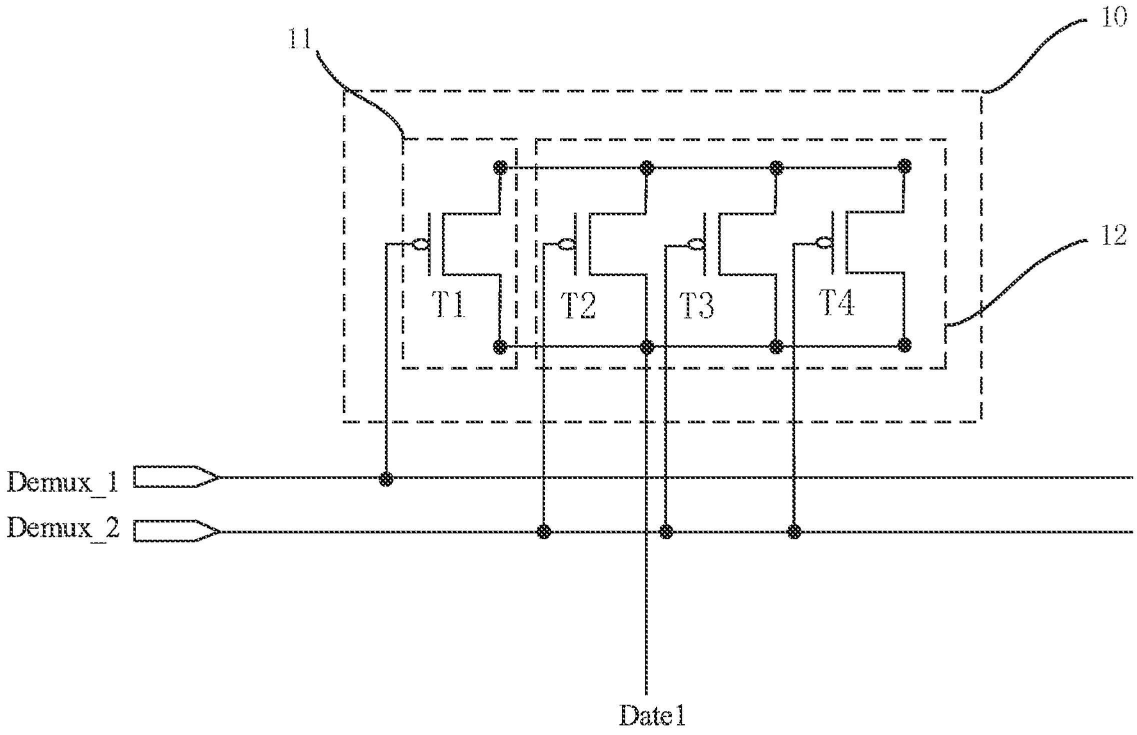
FIG. 6 is a schematic diagram illustrating a third type of equivalent circuit for a demultiplexer circuit provided in an embodiment of the present application.

FIG. 6 is a schematic diagram illustrating a third type of equivalent circuit for a demultiplexer circuit provided in an embodiment of the present application.

The schematic equivalent diagram of the demultiplexer circuit in the present embodiment is similar to or the same as the second type of schematic equivalent diagram of the demultiplexer circuit provided in foregoing embodiment, and is referred to the descriptions on the schematic equivalent diagram of the demultiplexer circuit in foregoing embodiment, and is not repeated herein. The differences between them are described below.

In the present embodiment, the first switch unit 11 includes a first switching transistor T1, and the second switch unit 12 includes a second switching transistor T2, a third switching transistor T3 and a fourth switching transistor T4.

In the demultiplexing module 10, a gate of the first switch transistor T1 is electrically connected to the first control signal line Demux_1 and a gate of the second switching transistor T2, a gate of the third switching transistor T3 and a gate of the fourth switching transistor T4 are electrically connected to the second control signal line Demux_2.

A source of the first switching transistor T1, a source of the second switching transistor T2, a source of the third switching transistor T3 and a source of the fourth switching transistor T4 are connected together to form the data signal input end of the demultiplexing module 10.

A drain of the first switching transistor T1, a drain of the second switching transistor T2, a drain of the third switching transistor T3 and a drain of the fourth switching transistor T4 are connected together to form the data signal input output of the demultiplexing module 10.

It can be understood that it is only for illustration for the case that the sources of switching transistors form the data signal input end of the demultiplexing module 10 and the drains of the switching transistors form the data signal output end of the demultiplexing module 10, and the present embodiment is not limited to this configuration.

The present embodiment provides a demultiplexer circuit. The demultiplexer circuit includes at least one demultiplexing module 10. The demultiplexing module at least includes a first switch unit 11, a second switch unit 12, a first control signal line Demux_1 and a second control signal line Demux_2. a control end of the first switch unit 11 is connected to the first control signal line Demux_1 and a control end of the second switch unit 12 is connected to the second control signal line Demux_2. The first control signal line Demux_1 outputs a first switch control signal to the first switch unit 11 and the second control signal line Demux_2 outputs a second switch control signal to the second switch unit 12. By electrically connecting the first control signal line Demux_1 and the second control signal line Demux_2 to the integrated circuit, the integrated circuit outputs the first switch control signal to the first switch unit 11 only by the first control signal line Demux_1 when the corresponding display panel operates at a low frequency, and the integrated circuit outputs the first switch control signal to the first switch unit 11 by the first control signal line Demux_1 and outputs the second switch control signal to the second switch unit 12 by the second control signal line Demux_2 when the display panel operates at a high frequency. Therefore, compared to the existing display panel that is compatible with high and low operating frequencies, the demultiplexer circuit provided in the present embodiment can effectively reduce power consumption of the display panel even though the channel width W of Demux device increases.

Figure 7:
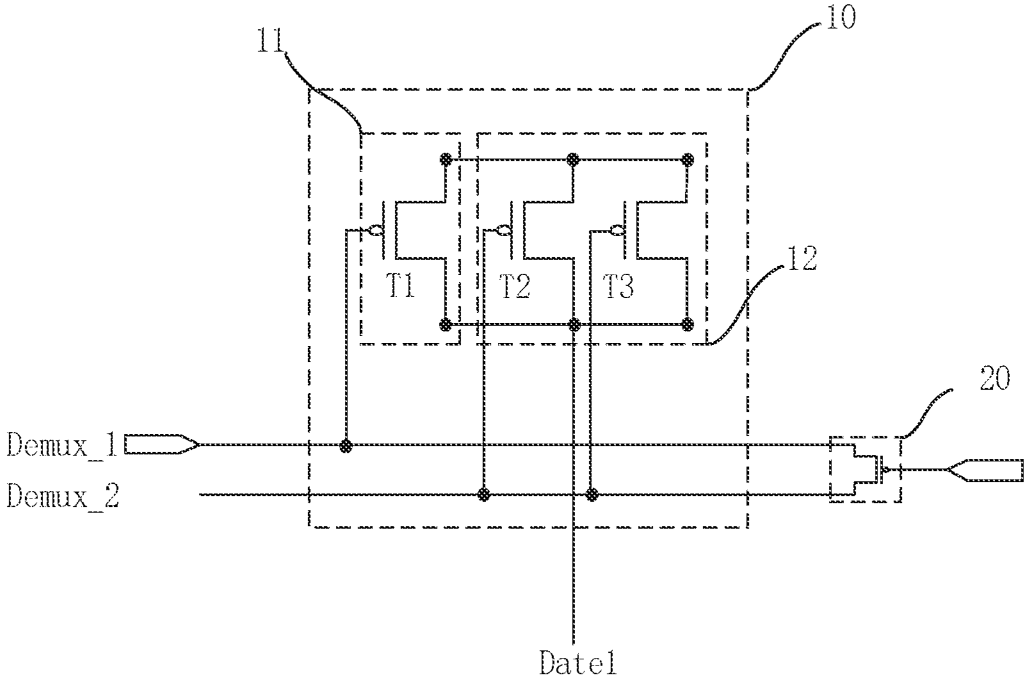
FIG. 7 is a schematic diagram illustrating a fourth type of equivalent circuit for a demultiplexer circuit provided in an embodiment of the present application.

FIG. 7 is a schematic diagram illustrating a fourth type of equivalent circuit for a demultiplexer circuit provided in an embodiment of the present application.

The schematic equivalent diagram of the demultiplexer circuit in the present embodiment is similar to or the same as the second type of schematic equivalent diagram of the demultiplexer circuit provided in foregoing embodiment, and is referred to the descriptions on the schematic equivalent diagram of the demultiplexer circuit in foregoing embodiment, and is not repeated herein. The differences between them are described below.

The first control signal line Demux_1 is electrically connected to the integrated circuit, the second control signal line Demux_2 is electrically connected to the first control signal line Demux_1 via a frequency-based switch 20, and a control end of the frequency-based switch 20 is electrically connected to the integrated circuit.

In the present embodiment, the first control signal line Demux_1 is electrically connected to the integrated circuit, and the second control signal line Demux_2 is electrically connected to the first control signal line via a frequency-based switch. In this way, when the corresponding display panel operates at the low frequency, the frequency-based switch 20 is switched off and the integrated circuit outputs the first switch control signal to the first switch unit 11 only by the first control signal line Demux_1; when the display panel operates at the high frequency, the frequency-based switch 20 is switched on, the frequency-based switch 20, the first control signal line Demux_1 and the second control signal line Demux_2 are synchronized for their signals, and the integrated circuit outputs the second switch control signal to the first switch unit 11 and the second switch unit 12 by the first control signal line Demux_1 and the second control signal line Demux_2. Therefore, compared to the existing display panel that is compatible with high and low operating frequencies, the demultiplexer circuit provided in the present embodiment can effectively reduce power consumption of the display panel even though the channel width W of Demux device increases. Moreover, the frequency-based switch 20 can automatically adjust display modes (e.g., a high-frequency display mode and a low-frequency display mode) of the display panel based on actual use cases without a need to be controlled by human beings, thereby improving applicability.

It needs to be noted that the first control signal includes but is not limited to a low level signal and the second control signal includes but is not limited to a high level signal, and the present application is not limited to this configuration.

Embodiment 2

FIG. 8 is a schematic diagram illustrating a first type of equivalent circuit for a demultiplexer circuit of a display panel provided in an embodiment of the present application.

The present application provides a display panel. The display panel includes a plurality of pixel units (not labeled in the figures), any of the pixel units including a plurality of subpixels P; a plurality of fanout lines, providing data signals for the pixel units; a demultiplexer circuit, including at least one demultiplexing module 10, the demultiplexing module 10 at least including a first switch unit 11 and a second switch unit 12; an integrated circuit (not shown in the figures), electrically connected to the demultiplexer circuit and providing control signals for the first switch unit 11 and the second switch unit 12 of the demultiplexer circuit.

In the present embodiment, the display panel further includes a plurality of auxiliary connecting lines (not labeled in the figure). Any of the fanout lines provides a data signal for the pixel unit by using the plurality of auxiliary connecting lines.

Specifically, in the present embodiment, any of the pixel units includes at least three subpixels including a first subpixel P1, a second subpixel P2 and a third subpixel P3. The plurality of fanout lines include a first fanout line 31. The first fanout line 31 provides a same data signal Date1 for the first subpixel P1, the second subpixel P2 and the third subpixel P3 by using the plurality of auxiliary connecting lines. The demultiplexer circuit includes at least three demultiplexing modules including a first demultiplexing module 110, a second demultiplexing module 120 and a third demultiplexing module 130. Each of the first demultiplexing module 110, the second demultiplexing module 120 and the third demultiplexing module 130 includes a first switch unit 11 and a second switch unit 12.

The first subpixel P1 corresponds to the first demultiplexing module 110, the second subpixel P2 corresponds to the second demultiplexing module 120, and the third subpixel P3 corresponds to the third demultiplexing module 130. A signal input end of the first switch unit 11 and a signal input end of the second switch unit 12 are connected to each other to form a data signal input end of the demultiplexing module 10, and a signal output end of the first switch unit 11 and a signal output end of the second switch unit 12 are connected to each other to form a data signal output end of the demultiplexing module 10.

In the present embodiment, the data signal input ends of the first demultiplexing module 110, the second demultiplexing module 120 and the third demultiplexing module 130 are all fed with the data signal Date 1 via the first fanout line 31; the data signal output end of each of the first demultiplexing module 110, the second demultiplexing module 120 and the third demultiplexing module 130 is connected to a corresponding column of subpixels P via a data line.

It needs to be noted that the number of the subpixels is not limited in the present embodiment, and the subpixel includes but is not limited to a red subpixel R, a green subpixel G and a blue subpixel B.

Moreover, the control ends of the first switch units 11 of the demultiplexing modules 10 corresponding to a same row of subpixels P with a same color are connected to the same first control signal line Demux_1, and the control ends of the second switch units 12 of the demultiplexing modules 10 corresponding to a same row of subpixels P with a same color are connected to the same second control signal line Demux_2.

Specifically, in the present embodiment, the demultiplexing module 10 further includes a plurality of control signal lines, the control signal lines include Demux_R1 line, Demux_R2 line, Demux_G1 line, Demux_G2 line, Demux_B1 line and Demux_B2 line, wherein the integrated circuit provides first switch control signals to the first switch units 11 by using the Demux_R1 line, the Demux_G1 line and the Demux_B1 line, and the integrated circuit provides second switch control signals to the second switch units 12 by using the Demux_R2 line, the Demux_G2 line and the Demux_B2 line.

In the present embodiment, the integrated circuit includes but is not limited to a data driving chip and the integrated circuit is configured to output signals to the plurality of control signal lines, the first demultiplexing module 110, the second demultiplexing module 120 and the third demultiplexing module 130.

Figure 9:
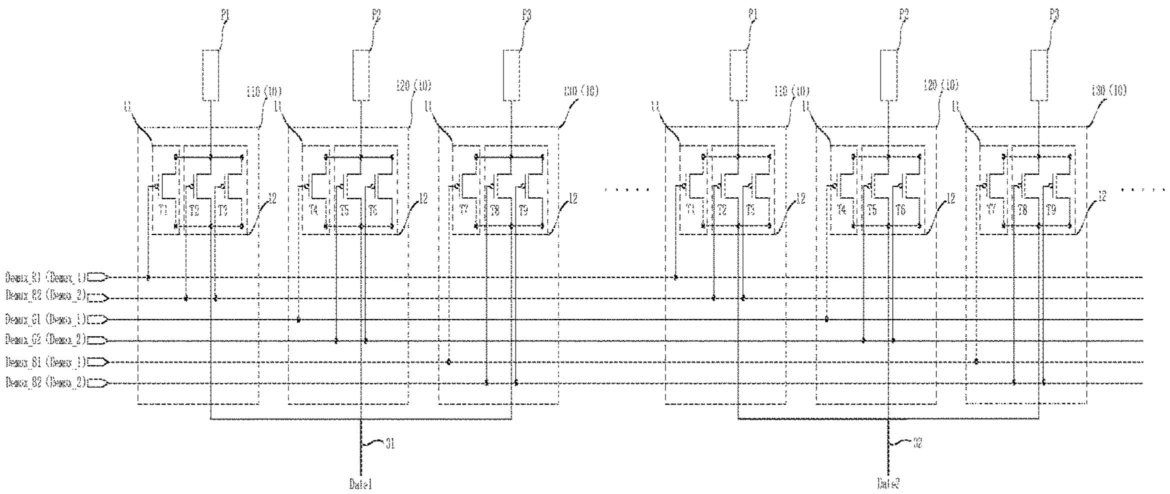
FIG. 9 is a schematic diagram illustrating an enlarged view of a first type of equivalent circuit for a demultiplexer circuit of a display panel provided in an embodiment of the present application.

It needs to be noted that in the present embodiment, referring to FIG. 9, the control ends of the first switch units 11 of the first demultiplexing modules 110 corresponding to a same row of first subpixels P1 are connected to the same Demux_R1 line, and the control ends of the second switch units 12 of the first demultiplexing modules 110 corresponding to a same row of first subpixels P1 are connected to the same Demux_R2 line; the control ends of the first switch units 11 of the second demultiplexing modules 120 corresponding to a same row of second subpixels P2 are connected to the same Demux_G1 line, and the control ends of the second switch units 12 of the second demultiplexing modules 120 corresponding to a same row of second subpixels P2 are connected to the same Demux_G2 line; the control ends of the first switch units 11 of the third demultiplexing modules 130 corresponding to a same row of third subpixels P3 are connected to the same Demux_B1 line, and the control ends of the second switch units 12 of the third demultiplexing modules 130 corresponding to a same row of third subpixels P3 are connected to the same Demux_G2 line.

In the present embodiment, in the first demultiplexing module 110, the first switch unit 11 includes a first switching transistor T1 and the second switch unit 12 includes a second switching transistor T2 and a third switching transistor T3.

A gate of the first switch transistor T1 is electrically connected to the Demux_R1 line and a gate of the second switching transistor T2 and a gate of the third switching transistor T3 are electrically connected to the Demux_R2 line.

A source of the first switching transistor T1, a source of the second switching transistor T2 and a source of the third switching transistor T3 are connected together to form the data signal input end of the first demultiplexing module 110.

A drain of the first switching transistor T1, a drain of the second switching transistor T2 and a drain of the third switching transistor T3 are connected together to form the data signal output end of the first demultiplexing module 110.

Moreover, the data signal input end of the first demultiplexing module 110 is connected to the first fanout line 31 by using the auxiliary connecting lines, and the data signal output end of the first demultiplexing module 110 is electrically connected to the first subpixel P1.

Specifically, the data signal input end of the first demultiplexing module 110 is fed with the data signal Date1 via the first fanout line 31.

In the present embodiment, in the second demultiplexing module 120, the first switch unit 11 includes a fourth switching transistor T4 and the second switch unit 12 includes a fifth switching transistor T5 and a sixth switching transistor T6.

A gate of the fourth switch transistor T4 is electrically connected to the Demux_G1 line and a gate of the fifth switching transistor T5 and a gate of the sixth switching transistor T6 are electrically connected to the Demux_G2 line.

A source of the fourth switching transistor T4, a source of the fifth switching transistor T5 and a source of the sixth switching transistor T6 are connected together to form the data signal input end of the first demultiplexing module 110.

A drain of the fourth switching transistor T4, a drain of the fifth switching transistor T5 and a drain of the sixth switching transistor T6 are connected together to form the data signal output end of the first demultiplexing module 110.

Moreover, the data signal input end of the second demultiplexing module 120 is connected to the first fanout line 31 by using the auxiliary connecting lines, and the data signal output end of the second demultiplexing module 120 is electrically connected to the second subpixel P2.

Specifically, the data signal input end of the second demultiplexing module 120 is fed with the data signal Date1 via the first fanout line 31.

In the present embodiment, in the third demultiplexing module 130, the first switch unit 11 includes a seventh switching transistor T7 and the second switch unit 12 includes an eighth switching transistor T8 and a ninth switching transistor T9.

A gate of the seventh switch transistor T7 is electrically connected to the Demux_B1 line and a gate of the eighth switching transistor T8 and a gate of the ninth switching transistor T9 are electrically connected to the Demux_RB2 line.

A source of the seventh switching transistor T7, a source of the eighth switching transistor T8 and a source of the ninth switching transistor T9 are connected together to form the data signal input end of the third demultiplexing module 130.

A drain of the seventh switching transistor T7, a drain of the eighth switching transistor T8 and a drain of the ninth switching transistor T9 are connected together to form the data signal output end of the third demultiplexing module 130.

Moreover, the data signal input end of the third demultiplexing module 130 is connected to the first fanout line 31 by using the auxiliary connecting lines, and the data signal output end of the third demultiplexing module 130 is electrically connected to the third subpixel P3.

Specifically, the data signal input end of the third demultiplexing module 130 is fed with the data signal Date1 via the first fanout line 31.

It can be understood that the first fanout line 31 provides a same data signal Date1 for the first subpixel P1, the second subpixel P2 and the third subpixel P3 by using the plurality of auxiliary connecting lines.

The present embodiment provides a display panel, in which the Demux_R1 line, the Demux_R2 line, the Demux_G1 line, the Demux_G2 line, the Demux_B1 line and the Demux_B2 line are electrically connected to the integrated circuit. In this way, when the display panel operates at a low frequency, the integrated circuit outputs the first switch control signals to the first switch units 11 via the Demux_R1 line, the Demux_G1 line and the Demux_B1 line; the first switching transistor T1, the fourth switching transistor T4 and the seventh switching transistor T7 are all switched on; all of the first subpixel P1, the second subpixel P2 and the third subpixel P3 receive data signals via the first switch units 11; when the display panel operates at a high frequency, the integrated circuit outputs the first switch control signals to the first switch units 11 via the Demux_R1 line, the Demux_G1 line and the Demux_B1 line and outputs the second switch control signals to the second switch units 12 via the Demux_R2 line, the Demux_G2 line and the Demux_B2 line; the first switching transistor T1, the second switching transistor T2, the third switching transistor T3, the fourth switching transistor T4, the fifth switching transistor T5, the sixth switching transistor T6, the seventh switching transistor T7, the eighth switching transistor T8 and the ninth switching transistor T9 are all switched on; all of the first subpixel P1, the second subpixel P2 and the third subpixel P3 receive data signals via the first switch units 11 and the second switch units 12. Therefore, compared to the existing display panel that is compatible with high and low operating frequencies, the display panel provided in the present embodiment can effectively reduce power consumption even though the channel width W of Demux device increases.

FIG. 10 is a schematic diagram illustrating a second type of equivalent circuit for a demultiplexer circuit of a display panel provided in an embodiment of the present application.

The schematic equivalent diagram of the demultiplexer circuit of the display panel in the present embodiment is similar to or the same as the first type of schematic equivalent diagram of the demultiplexer circuit of the display panel provided in foregoing embodiment, and is referred to the descriptions on the schematic equivalent diagram of the demultiplexer circuit of the display panel in foregoing embodiment, and is not repeated herein. The differences between them are described below.

The Demux_R1 line, the Demux_G1 line and the Demux_B1 line are electrically connected to the integrated circuit, the Demux_R2 line is electrically connected to the Demux_R1 line via a first frequency-based switch 21, the Demux_G2 line is electrically connected to the Demux_G1 line via a second frequency-based switch 22, the Demux_B2 line is electrically connected to the Demux_B1 line via a third frequency-based switch 23, and a control end of the frequency-based switch 20 is electrically connected to the integrated circuit.

The present embodiment utilizes above connections. When the display panel operates at a low frequency, all of the first frequency-based switch 21, the second frequency-based switch 22 and the third frequency-based switch 23 are switched off, the integrated circuit outputs the first switch control signals to the first switch units 11 via the Demux_R1 line, the Demux_G1 line and the Demux_B1 line; the first switching transistor T1, the fourth switching transistor T4 and the seventh switching transistor T7 are all switched on, all of the first subpixel P1, the second subpixel P2 and the third subpixel P3 receive data signals via the first switch units 11.

When the display panel operates at a high frequency, all of the first frequency-based switch 21, the second frequency-based switch 22 and the third frequency-based switch 23 are switched on, the first frequency-based switch 21, the Demux_R1 line and the Demux_R2 line are synchronized for signals, the second frequency-based switch 22, the Demux_G1 line and the Demux_G2 line are synchronized for signals, the third frequency-based switch 23, the Demux_B1 line and the Demux_B2 line are synchronized for signals, the integrated circuit outputs the second switch control signal to the first demultiplexing module 110 via the Demux_R1 line and the Demux_R2 line, outputs the second switch control signal to the second demultiplexing module 120 via the Demux_G1 line and the Demux_G2 line and outputs the second switch control signal to the third demultiplexing module 130 via the Demux_B1 line and the Demux_B2 line such that the first switching transistor T1, the second switching transistor T2, the third switching transistor T3, the fourth switching transistor T4, the fifth switching transistor T5, the sixth switching transistor T6, the seventh switching transistor T7, the eighth switching transistor T8 and the ninth switching transistor T9 are all switched on; all of the first subpixel P1, the second subpixel P2 and the third subpixel P3 receive data signals via the first switch units 11 and the second switch units 12.

Therefore, compared to the existing display panel that is compatible with high and low operating frequencies, the demultiplexer circuit provided in the present embodiment can effectively reduce power consumption of the display panel even though the channel width W of Demux device increases. Moreover, the frequency-based switch 20 can automatically adjust display modes (e.g., a high-frequency display mode and a low-frequency display mode) of the display panel based on actual use cases without a need to be controlled by human beings, thereby improving applicability.

It needs to be noted that in the present embodiment, the first control signal includes but is not limited to a low level signal and the second control signal includes but is not limited to a high level signal.

Embodiment 3

Figure 11:
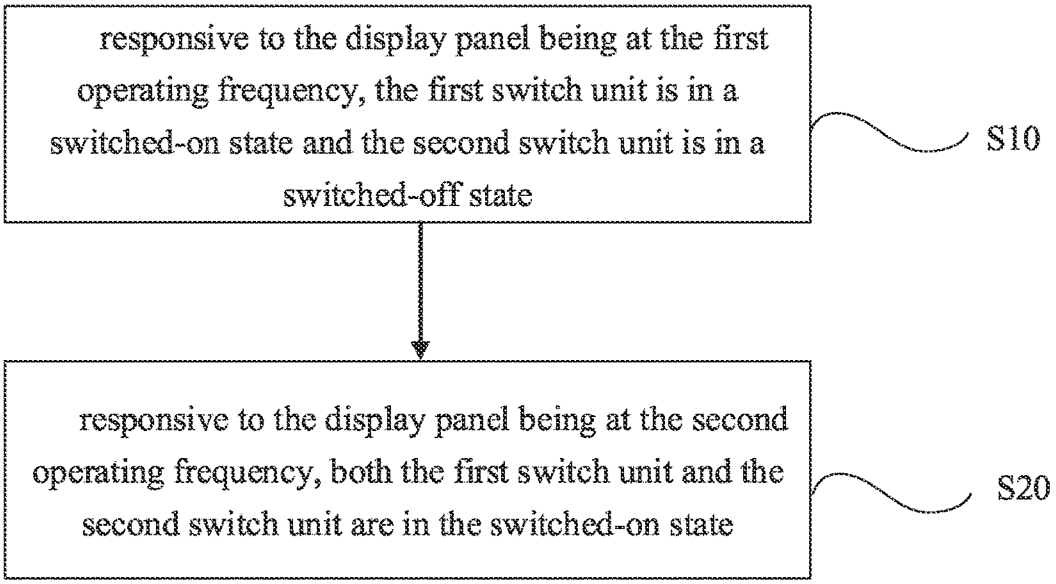
FIG. 11 is a flowchart of a driving method of a display panel provided in an embodiment of the present application.

FIG. 11 is a flowchart of a driving method of a display panel provided in an embodiment of the present application.

The present embodiment provides a driving method of a display panel including the display panel provided in above embodiments. The display panel includes a first operating frequency and a second operating frequency, in which the first operating frequency is less than the second operating frequency.

The display panel has been described in detail in above embodiments and is not repeated herein.

By accompanying with FIG. 8, the display panel driving method of the present embodiment includes:

S10: responsive to the display panel being at the first operating frequency, the first switch unit 11 is in a switched-on state and the second switch unit is in a switched-off state.

S20: responsive to the display panel being at the second operating frequency, both the first switch unit and the second switch unit are in the switched-on state.

The first operating frequency is for a low-frequency operating state and the second operating frequency is for a high-frequency operating state.

The Demux_R1 line, the Demux_R2 line, the Demux_G1 line, the Demux_G2 line, the Demux_B1 line and the Demux_B2 line are electrically connected to the integrated circuit.

When the display panel operates at the first operating frequency, the integrated circuit outputs the first switch control signals to the first switch units 11 only by using the Demux_R1 line, the Demux_G1 line and the Demux_B1 line; the first switching transistor T1, the fourth switching transistor T4 and the seventh switching transistor T7 are all switched on; all of the first subpixel P1, the second subpixel P2 and the third subpixel P3 receive data signals via the first switch units 11.

When the display panel operates at the second operating frequency, the integrated circuit outputs the first switch control signals to the first switch units 11 via the Demux_R1 line, the Demux_G1 line and the Demux_B1 line and outputs the second switch control signals to the second switch units 12 via the Demux_R2 line, the Demux_G2 line and the Demux_B2 line; the first switching transistor T1, the second switching transistor T2, the third switching transistor T3, the fourth switching transistor T4, the fifth switching transistor T5, the sixth switching transistor T6, the seventh switching transistor T7, the eighth switching transistor T8 and the ninth switching transistor T9 are all switched on; all of the first subpixel P1, the second subpixel P2 and the third subpixel P3 receive data signals via the first switch units 11 and the second switch units 12. The driving method of the display panel provided in the present embodiment can effectively reduce power consumption of the display panel.

By accompanying with FIG. 10, the Demux_R1 line, the Demux_G1 line and the Demux_B1 line are electrically connected to the integrated circuit, the Demux_R2 line is electrically connected to the Demux_R1 line via a first frequency-based switch 21, the Demux_G2 line is electrically connected to the Demux_G1 line via a second frequency-based switch 22, the Demux_B2 line is electrically connected to the Demux_B1 line via a third frequency-based switch 23, and a control end of the frequency-based switch 20 is electrically connected to the integrated circuit.

When the display panel operates at the first operating frequency, all of the first frequency-based switch 21, the second frequency-based switch 22 and the third frequency-based switch 23 are switched off, the integrated circuit outputs the first switch control signals to the first switch units 11 via the Demux_R1 line, the Demux_G1 line and the Demux_B1 line; the first switching transistor T1, the fourth switching transistor T4 and the seventh switching transistor T7 are all switched on, all of the first subpixel P1, the second subpixel P2 and the third subpixel P3 receive data signals via the first switch units 11.

When the display panel operates at the second operating frequency, all of the first frequency-based switch 21, the second frequency-based switch 22 and the third frequency-based switch 23 are switched on, the first frequency-based switch 21, the Demux_R1 line and the Demux_R2 line are synchronized for signals, the second frequency-based switch 22, the Demux_G1 line and the Demux_G2 line are synchronized for signals, the third frequency-based switch 23, the Demux_B1 line and the Demux_B2 line are synchronized for signals, the integrated circuit outputs the second switch control signal to the first demultiplexing module 110 via the Demux_R1 line and the Demux_R2 line, outputs the second switch control signal to the second demultiplexing module 120 via the Demux_G1 line and the Demux_G2 line and outputs the second switch control signal to the third demultiplexing module 130 via the Demux_B1 line and the Demux_B2 line such that the first switching transistor T1, the second switching transistor T2, the third switching transistor T3, the fourth switching transistor T4, the fifth switching transistor T5, the sixth switching transistor T6, the seventh switching transistor T7, the eighth switching transistor T8 and the ninth switching transistor T9 are all switched on; all of the first subpixel P1, the second subpixel P2 and the third subpixel P3 receive data signals via the first switch units 11 and the second switch units 12.

It needs to be noted that in the present embodiment, the first control signal is a low level signal and the second control signal is a high level signal.

The driving method of the display panel provided in the present embodiment can effectively reduce power consumption of the display panel. Moreover, the frequency-based switch 20 can automatically adjust display modes (e.g., a high-frequency display mode and a low-frequency display mode) of the display panel based on actual use cases without a need to be controlled by human beings, thereby improving applicability.

Above all, the embodiments of the present application provide a demultiplexer circuit, a display panel and a driving method of a display panel. The demultiplexer circuit includes at least one demultiplexing module, the demultiplexing module at least including a first switch unit and a second switch unit. The display panel includes a first operating frequency and a second operating frequency, wherein the first operating frequency is less than the second operating frequency. Responsive to the display panel being at the first operating frequency, the first switch unit is in a switched-on state and the second switch unit is in a switched-off state; responsive to the display panel being at the second operating frequency, both the first switch unit and the second switch unit are in the switched-on state. The present application can effectively reduce power consumption of the display panel when utilizing the driving method to drive the display panel to display images.

It should be understood that those of ordinary skill in the art may make equivalent modifications or variations according to the technical schemes and invention concepts of the present application, but all such modifications and variations should be within the appended claims of the present application.

The invention claimed is:

1. A demultiplexer circuit, wherein the demultiplexer circuit comprises at least one demultiplexing module, and the demultiplexing module at least comprises a first switch unit and a second switch unit;

a signal input end of the first switch unit and a signal input end of the second switch unit are connected to each other to form a data signal input end of the demultiplexing module, and a signal output end of the first switch unit and a signal output end of the second switch unit are connected to each other to form a data signal output end of the demultiplexing module;

wherein the demultiplexing module further comprises a plurality of control signal lines, the control signal lines at least comprise a first control signal line and a second control signal line, a control end of the first switch unit is connected to the first control signal line, and a control end of the second switch unit is connected to the second control signal line;

wherein the first control signal line outputs a first switch control signal to the first switch unit, and the second control signal line outputs a second switch control signal to the second switch unit; and wherein the first control signal line is electrically connected to an integrated circuit, the second control signal line is electrically connected to the first control signal line via a frequency-based switch, and a control end of the frequency-based switch is electrically connected to the integrated circuit.

2. The demultiplexer circuit according to claim 1, wherein the first control signal line and the second control signal line are electrically connected to an integrated circuit.

3. The demultiplexer circuit according to claim 1, wherein the first control signal line outputs a second switch control signal to the first switch unit, and the second control signal line outputs the second switch control signal to the second switch unit.

4. The demultiplexer circuit according to claim 1, wherein the first switch unit at least comprises a first switching transistor, and the second switch unit at least comprises a second switching transistor;

wherein in the demultiplexing module, the first control signal line is electrically connected to a gate of the first switching transistor and the second control signal line is electrically connected to a gate of the second switching transistor.

5. The demultiplexer circuit according to claim 4, wherein a source of the first switching transistor and a source of the second switching transistor are connected to each other to form the data signal input end of the demultiplexing module;

a drain of the first switching transistor and a drain of the second switching transistor are connected to each other to form the data signal output end of the demultiplexing module.

6. The demultiplexer circuit according to claim 1, wherein at least one of the first switch unit and the second switch unit comprises N switching transistors, where N is a positive integer greater than or equal to 2.

7. The demultiplexer circuit according to claim 6, wherein the first switch unit at least comprises a first switching transistor, and the second switch unit comprises a second switching transistor and a third switching transistor;

wherein in the demultiplexing module, a gate of the first switch transistor is electrically connected to the first control signal line and a gate of the second switching transistor and a gate of the third switching transistor are electrically connected to the second control signal line.

8. The demultiplexer circuit according to claim 7, wherein a source of the first switching transistor, a source of the second switching transistor and a source of the third switching transistor are connected together to form the data signal input end of the demultiplexing module;

a drain of the first switching transistor, a drain of the second switching transistor and a drain of the third switching transistor are connected together to form the data signal output end of the demultiplexing module.

9. A display panel, comprising:

a plurality of pixel units, any of the pixel units comprising a plurality of subpixels;

a plurality of fanout lines, providing data signals for the pixel units;

a demultiplexer circuit, comprising at least one demultiplexing module, the demultiplexing module at least comprising a first switch unit and a second switch unit;

an integrated circuit, electrically connected to the demultiplexer circuit and providing control signals for the first switch unit and the second switch unit of the demultiplexer circuit;

wherein any of the pixel units corresponds to a plurality of said demultiplexing modules; in the demultiplexing module, a signal input end of the first switch unit and a signal input end of the second switch unit are connected to each other to form a data signal input end of the demultiplexing module, and a signal output end of the first switch unit and a signal output end of the second switch unit are connected to each other to form a data signal output end of the demultiplexing module, and wherein the first control signal line is electrically connected to the integrated circuit, the second control signal line is electrically connected to the first control signal line via a frequency-based switch, and a control end of the frequency-based switch is electrically connected to the integrated circuit.

10. The display panel according to claim 9, wherein the data signal input ends of the demultiplexing modules of the demultiplexer circuit corresponding to a same pixel unit are fed with a same data signal by a same fanout line, and the data signal output end of any of the demultiplexing modules of the demultiplexer circuit is electrically connected to the subpixel.

11. The display panel according to claim 9, wherein the demultiplexing module further comprises a plurality of control signal lines, the control signal lines at least comprise a first control signal line and a second control signal line, a control end of the first switch unit is connected to the first control signal line, and a control end of the second switch unit is connected to the second control signal line.

12. The display panel according to claim 11, wherein the control ends of the first switch units of the demultiplexing modules corresponding to a same row of subpixels with a same color are connected to the same first control signal line, and the control ends of the second switch units of the demultiplexing modules corresponding to a same row of subpixels with a same color are connected to the same second control signal line.

13. The display panel according to claim 11, wherein the first control signal line outputs a first switch control signal to the first switch unit, and the second control signal line outputs a second switch control signal to the second switch unit.

14. The display panel according to claim 13, wherein the first control signal line and the second control signal line are electrically connected to the integrated circuit.

15. The display panel according to claim 11, wherein the first control signal line outputs a second switch control signal to the first switch unit, and the second control signal line outputs the second switch control signal to the second switch unit.

16. A driving method of a display panel, the display panel comprising:

a plurality of pixel units, any of the pixel units comprising a plurality of subpixels;

a plurality of fanout lines, providing data signals for the pixel units;

a demultiplexer circuit, comprising at least one demultiplexing module, the demultiplexing module at least comprising a first switch unit and a second switch unit;

an integrated circuit, electrically connected to the demultiplexer circuit and providing control signals for the first switch unit and the second switch unit of the demultiplexer circuit;

wherein any of the pixel units corresponds to a plurality of said demultiplexing modules; in the demultiplexing module, a signal input end of the first switch unit and a signal input end of the second switch unit are connected to each other to form a data signal input end of the demultiplexing module, and a signal output end of the first switch unit and a signal output end of the second switch unit are connected to each other to form a data signal output end of the demultiplexing module;

the display panel further comprising a first operating frequency and a second operating frequency, wherein the first operating frequency is less than the second operating frequency;

responsive to the display panel being at the first operating frequency, the first switch unit is in a switched-on state and the second switch unit is in a switched-off state;

responsive to the display panel being at the second operating frequency, both the first switch unit and the second switch unit are in the switched-on state, and wherein the first control signal line is electrically connected to the integrated circuit, the second control signal line is electrically connected to the first control signal line via a frequency-based switch, and a control end of the frequency-based switch is electrically connected to the integrated circuit.

17. The driving method of the display panel according to claim 16, wherein the first operating frequency is for a low-frequency operating state and the second operating frequency is for a high-frequency operating state.

* * * * *